Sept. 12, 1950        S. PETERSEN        2,522,398
LABEL HOLDER FOR MILK CANS
Filed Jan. 29, 1947
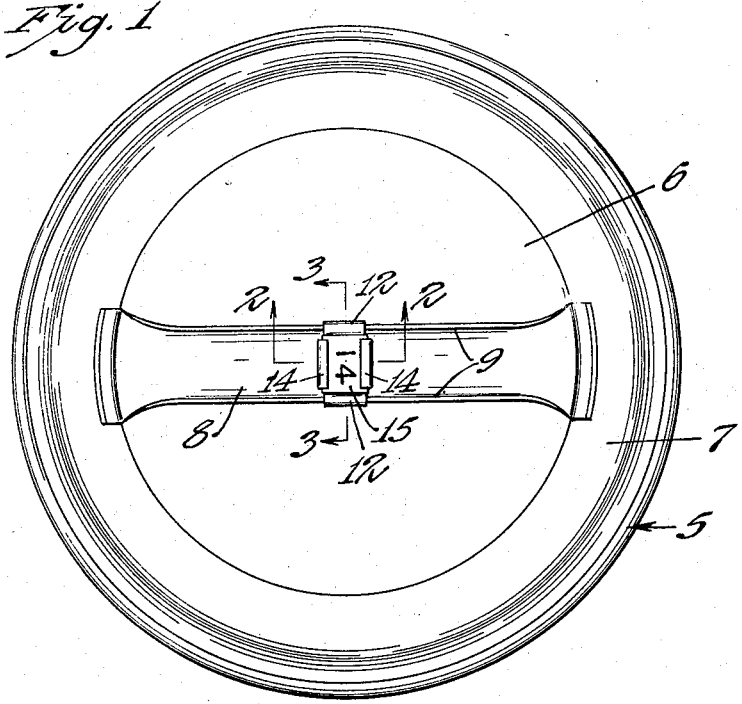
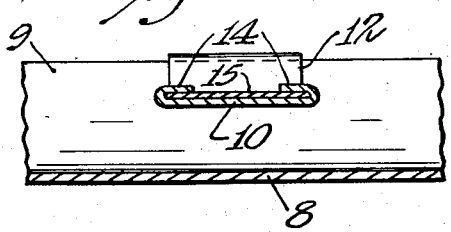
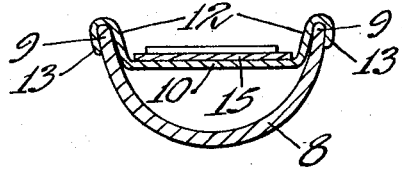
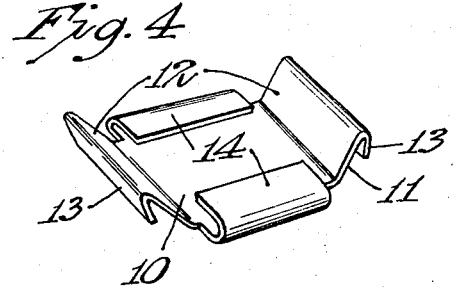
Inventor
Svend Petersen
By Williamson & Williamson
Attorneys Patented Sept. 12, 1950

2,522,398

UNITED STATES PATENT OFFICE 2,522,398

LABEL HOLDER FOR MILK CANS

Svend Petersen, Askov, Minn.

Application January 29, 1947, Serial No. 725,131

1 Claim. (Cl. 40—11)

This invention relates to label or identification device holders and is particularly adaptable for mounting on concavo-convex supporting structures such as are frequently used as the handles of milk cans, said handles being located either on the can itself or upon the removable can cover.

It is a general object of the invention to provide an identification device holder for milk cans which is simple and economical in construction and which will securely hold an identification device on the handle in such a way that it does not interfere with proper grasping of the handle, and wherein the identification device, commonly in the form of a printed ticket, is securely held yet easily removable therefrom.

The above and other objects and advantages of the invention will more fully appear from the following description made in connection with the accompanying drawings, wherein like reference characters refer to the same parts throughout the views, and in which:

Figure 1 is a plan view of a milk can cover with the identification holder thereon;

Figure 2 is an enlarged fragmentary sectional view taken approximately on the line 2—2 of Figure 1;

Figure 3 is an enlarged fragmentary sectional view taken approximately on the line 3—3 of Figure 1; and Figure 4 is a perspective view of the holder per se.

In Figure 1 there is shown a conventional milk can cover 5 having a depressed central portion 6 and an upstanding side wall 7. Between opposite portions of the side wall 7 extends a handle 8 which, as shown in Figure 3, is concavo-convex in cross section with the concave side directed upwardly, the convex under side providing a rounded surface which affords a comfortable weight imposing grip for the hand. The upper side portions of the handle 8 are defined by upwardly directed relatively thin edges 9.

The identification device holder is shown in perspective in Figure 4. It is made from a one-piece blank, as clearly indicated, and includes a flat rectangular central body portion 10. From opposite side edges of the body 10 are tongues 11 which have portions 12 extending upwardly from the body 10 at slightly greater than 90 degrees therefrom, and the tongues 11 have upper bent-over portions 13. As clearly indicated in Figures 2 and 3, the bent-over tongue portions 13 fit over the side edge portions 9 of the handle 8, and attention is called to the fact that said bent-over portions are bent preferably beyond the vertical so that they will closely fit the contour of the handle. The device is preferably made of a resilient material so that it will grip the handle and not become easily displaced.

Extending from the opposite sides of the central body portion 10 from the tongues 12 are tongues 14 which are bent upon themselves and extend inwardly toward each other terminating in spaced relation to each other and exposing a considerable part of the central body portion 10. Referring to Figures 2, 3 and 4 it will be seen that the tongues 14 are considerably lower than the uppermost portions of the bent-over tongues 12, and it should also be noted that the side edges of the bent tongues 14 terminate fairly close to the lower portions of said tongues 12.

In Figures 1, 2 and 3 there is shown an identification card 15 which may be in the form of a piece of paper with a number or other identification printed thereon. The card 15 is placed in the holder by slipping it beneath the tongues 14 in a direction transversely of said tongues, from adjacent one of the upstanding tongues 12 toward the other of said tongues 12. When the card is placed in position, as shown in Figures 1 through 3, the upstanding tongues 12 will retain it against displacement, but it can be removed when desired by pushing it toward one of the tongues 12 whose slanted inner side face will cause the approaching end of the card to bend upwardly so that it will slip out of the holder.

It should be noted that the entire holder is made preferably of a single sheet of metal, and it is relatively simple to stamp and form. When it is installed on a milk can cover by flexing the bent-over tongues 13 slightly so that they will snap over the handle edges 9, the device is securely positioned on the handle and at the same time permits the handle to be gripped in the ordinary manner without interfering with the normal function of the handle. Furthermore the card-holding central body 10 and bent-over tongues 14 are lower than the bent-over edges 13 of the upstanding tongues 12 so that the main body portion and tongues 14 are located below and between the upper edges of the handle 8. The identification card 15 is conveniently held against displacement and is readily visible to the butter maker in the creamery so that he can properly keep track of the shipments of milk and cream made by the individual dairymen.

It will, of course, be understood that various changes may be made in the form, details, arrangement and proportions of the various parts without departing from the scope of my invention.

What I claim is:

In combination with the top for a milk can having an elongated handle extending across the upper portion thereof and with the sides thereof concavely bent up to form a trough-like portion, a label holder comprising a normally horizontal body having a width somewhat less than the distance between the inner walls of the trough, said body having oppositely disposed handle edge engaging portions on opposite sides thereof and extending upwardly at an obtuse angle relative to said body, whereby said body is securely held between and below the upper edges of said handle, and said body having means for retaining a removable label on the upper side thereof.

SVEND PETERSEN.

REFERENCES CITED

The following references are of record in the file of this patent:

UNITED STATES PATENTS

| Number | Name | Date |
| --- | --- | --- |
| 485,002 | Dewey | Oct. 25, 1892 |
| 778,316 | Jaquith | Dec. 27, 1904 |
| 1,864,491 | Hopp | June 21, 1932 |
| 2,048,906 | Webster | July 28, 1936 |
| 2,173,306 | McDonnell | Sept. 19, 1939 |

FOREIGN PATENTS

| Number | Country | Date |
| --- | --- | --- |
| 27,230 | Netherlands | June 15, 1932 |